(12) United States Patent
Kato (10) Patent No.: US 9,210,283 B2
(45) Date of Patent: Dec. 8, 2015

(54) IMAGE READING APPARATUS AND DOCUMENT READING METHOD

(75) Inventor: Masashi Kato, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 812 days.

(21) Appl. No.: 13/404,613

(22) Filed: Feb. 24, 2012

(65) Prior Publication Data

US 2013/0083352 A1 Apr. 4, 2013

(30) Foreign Application Priority Data

Sep. 30, 2011 (JP) .................................. 2011-218417

(51) Int. Cl.
*H04N 1/00* (2006.01)

(52) U.S. Cl.
CPC ....... *H04N 1/00811* (2013.01); *H04N 1/00474* (2013.01); *H04N 1/00482* (2013.01); *H04N 1/00517* (2013.01); *H04N 1/00936* (2013.01)

(58) Field of Classification Search
USPC ......................................... 358/1.15, 474, 505
See application file for complete search history.

(56) References Cited

U.S. PATENT DOCUMENTS

| | | | |
|---|---|---|---|
| 5,826,133 A | 10/1998 | Saito et al. | |
| 6,330,083 B1 * | 12/2001 | Nabeshima et al. | 358/474 |
| 2003/0038989 A1 | 2/2003 | Yokota et al. | |
| 2006/0075150 A1 | 4/2006 | Hwang et al. | |
| 2008/0273229 A1 | 11/2008 | Morisawa | |
| 2009/0034027 A1 | 2/2009 | Yoshimoto et al. | |
| 2009/0213437 A1 | 8/2009 | Takeuchi | |
| 2010/0128331 A1 * | 5/2010 | Hamano et al. | 358/505 |

FOREIGN PATENT DOCUMENTS

| | | |
|---|---|---|
| CN | 1756288 A | 4/2006 |
| CN | 101299792 A | 11/2008 |
| EP | 1292104 A1 | 3/2003 |
| JP | 8-116436 A | 5/1996 |
| JP | 2004-320333 A | 11/2004 |
| JP | 2005-86756 A | 3/2005 |
| JP | 3643700 B2 | 4/2005 |
| JP | 2008-54173 A | 3/2008 |
| JP | 2008-182382 A | 8/2008 |
| JP | 2010-130111 A | 6/2010 |
| JP | 2010-212789 A | 9/2010 |

OTHER PUBLICATIONS

Extended European Search Report dated May 29, 2013 from related application 12156792.9.
Notification of Reason for Refusal dated Sep. 3, 2013 from related JP 2011-218417 together with partial English translation.
Chinese Office Action dated Feb. 9, 2015 from related Chinese Application No. 201210072683.2, together with an English language translation.
Chinese Office Action dated Aug. 13, 2014 from related Chinese Application No. 2012100726832, together with an English language translation.

* cited by examiner

*Primary Examiner* — Marivelisse Santiago Cordero
*Assistant Examiner* — Temitayo Folayan
(74) *Attorney, Agent, or Firm* — Scully, Scott, Murphy & Presser, P.C.

(57) ABSTRACT

An image reading apparatus includes: an operation unit; a setting unit configured to set one of a plurality of operation modes, in which different processing is executed for a document, in accordance with an operation content of the operation unit; a reading unit configured to read the document in response to a reading execution request from the operation unit; and a control unit configured to control the reading unit whether or not to execute a reading preparation operation before the reading execution request is made depending on the set operation modes set by the setting unit.

13 Claims, 7 Drawing Sheets

IMAGE READING APPARATUS AND DOCUMENT READING METHOD

CROSS-REFERENCE TO RELATED APPLICATIONS

This application claims priority from Japanese Patent Application No. 2011-218417 filed on Sep. 30, 2011, the entire subject matter of which is incorporated herein by reference.

TECHNICAL FIELD

The invention relates to an image reading apparatus and a document reading method, and more specifically, to a technology enabling reduction of reading start time in an image reading apparatus.

BACKGROUND

There have been proposed a technology enabling reduction of reading start time in an image reading apparatus in which, after performing a variety of setting operations, a black level (dark level) is corrected before a reading start request for reading a document is made, so as to reduce time required to start reading the document after the reading start request is made.

According to the above-described related art, it may be possible to reduce the time required to start reading the document by correcting the black level before the reading start request is made. However, there is a case where it is not necessarily required to correct the black level. For example, for a mode in which a reading condition such as reading resolution is frequently re-set after performing a variety of setting operations, when the black level is corrected before the reading start request is made, efficiency in start reading the document may be lowered on the contrary.

SUMMARY

Illustrative aspects of the invention provide a technology of improving efficiency in reading a document.

According to a first illustrative aspect of the invention, there is provided an image reading apparatus comprising: an operation unit; a setting unit configured to set one of a plurality of operation modes, in which different processing is executed for a document, in accordance with an operation content of the operation unit; a reading unit configured to read the document in response to a reading execution request from the operation unit; and a control unit configured to control the reading unit whether or not to execute a reading preparation operation before the reading execution request is made depending on the set operation modes set by the setting unit.

According to a second illustrative aspect of the invention, in the image reading apparatus, wherein the control unit is configured to: when the set operation mode is a first operation mode, control the reading unit to execute the reading preparation operation before the reading execution request is made; and when the set operation mode is a second operation mode, control the reading unit to execute the reading preparation operation after the reading execution request is made.

According to a third illustrative aspect of the invention, in the image reading apparatus, wherein the plurality of operation modes comprises operation modes in which output destinations of read data are respectively different.

According to a fourth illustrative aspect of the invention, in the image reading apparatus, wherein the plurality of operation modes comprises a FAX transmission mode, a copy mode and a scan mode, and wherein the control unit is configured to: control the FAX transmission mode as the first operation mode; and control the copy mode and the scan mode as the second operation mode.

According to a fifth illustrative aspect of the invention, the image reading apparatus further comprises: a registration unit configured to register a predetermined operation mode as an operation mode belonging to one of the first operation mode and the second operation mode in accordance with the operation content of the operation unit.

According to a sixth illustrative aspect of the invention, the image reading apparatus further comprises: a change unit configured to change a reading condition by the reading unit in accordance with the operation content of the operation unit; and a storage unit configured to store a frequency that the reading condition is changed after setting the operation mode, for each of the operation modes, wherein the control unit is configured to: control an operation mode having a low frequency as the first operation mode; and control an operation mode having a high frequency as the second operation mode.

According to a seventh illustrative aspect of the invention, in the image reading apparatus, wherein the reading preparation operation comprises a non-lighting operation in which a light source of the reading unit is not turned on.

According to an eighth illustrative aspect of the invention, in the image reading apparatus, wherein the non-lighting operation comprises a black data acquisition operation for correcting read data and a dark level acquisition operation for analog front end adjustment.

According to a ninth illustrative aspect of the invention, in the image reading apparatus, wherein the reading preparation operation comprises a white data acquisition operation and a light-amount adjustment operation.

According to a tenth illustrative aspect of the invention, the image reading apparatus further comprises: a timing unit configured to measure elapsed time from a time when the reading unit executes the reading preparation operation before the reading execution request is made to a time when the reading execution request is made, wherein when the elapsed time is equal to or longer than predetermined time, the control unit controls the reading unit to re-execute the reading preparation operation.

According to an eleventh illustrative aspect of the invention, the image reading apparatus further comprises: a change unit configured to change a reading condition by the reading unit in accordance with the operation content of the operation unit, wherein when the reading condition is changed after the reading unit is controlled to execute the reading preparation operation before the reading execution request is made, the control unit controls the reading unit to re-execute the reading preparation operation.

According to a twelfth illustrative aspect of the invention, in the image reading apparatus, wherein when another operation mode, which is different from the set operation mode, is set after the reading unit is controlled to execute the reading preparation operation before the reading execution request is made in accordance with the set operation mode, the control unit controls the reading unit to re-execute the reading preparation operation.

According to a thirteenth illustrative aspect of the invention, the image reading apparatus further comprises: a change unit configured to change a reading condition by the reading unit in accordance with the operation content of the operation unit, wherein when another operation mode, which is different from the set operation mode, is set and the reading condition is changed after the reading unit is controlled to execute the reading preparation operation before the reading execution request is made in accordance with the set operation mode, the control unit controls the reading unit to re-execute the reading preparation operation.

According to a fourteenth illustrative aspect of the invention, there is provided a document reading method for an image reading apparatus having a plurality of operation modes in which different processing is executed for a document and comprising a reading unit configured to read the document in accordance with a reading execution request from a user, the document reading method comprising: a setting process of setting one of the plurality of operation modes in accordance with selection of the user; a determination process of determining whether or not to control the reading unit to execute a reading preparation operation before the reading execution request is made depending on the set operation modes; and a reading process of reading the document by the reading unit after the determination process.

According to still another illustrative aspect of the invention, there is provided an image reading apparatus having a plurality of operation modes in which different processing is executed for a document, the image reading apparatus comprising: an operation unit configured to allow a user to input a reading execution request; a reading unit configured to read the document in response to a reading execution request from the operation unit; and a controller configured to: set one of the plurality of operation modes in accordance with an operation content of the operation unit; and control the reading unit whether or not to execute a reading preparation operation before the reading execution request is made depending on the set operation modes set by the setting unit.

The invention controls the reading unit whether or not to perform the reading preparation operation before the reading execution request is made, depending on the difference of the set operation modes set by the setting unit. Therefore, it is possible to improve the efficiency in reading a document.

DETAILED DESCRIPTION

<First Exemplary Embodiment>

In the below, a first exemplary embodiment of the invention will be described with reference to FIGS. 1 to 4.

1. Configuration of Multi-function Device 1

Figure 1:
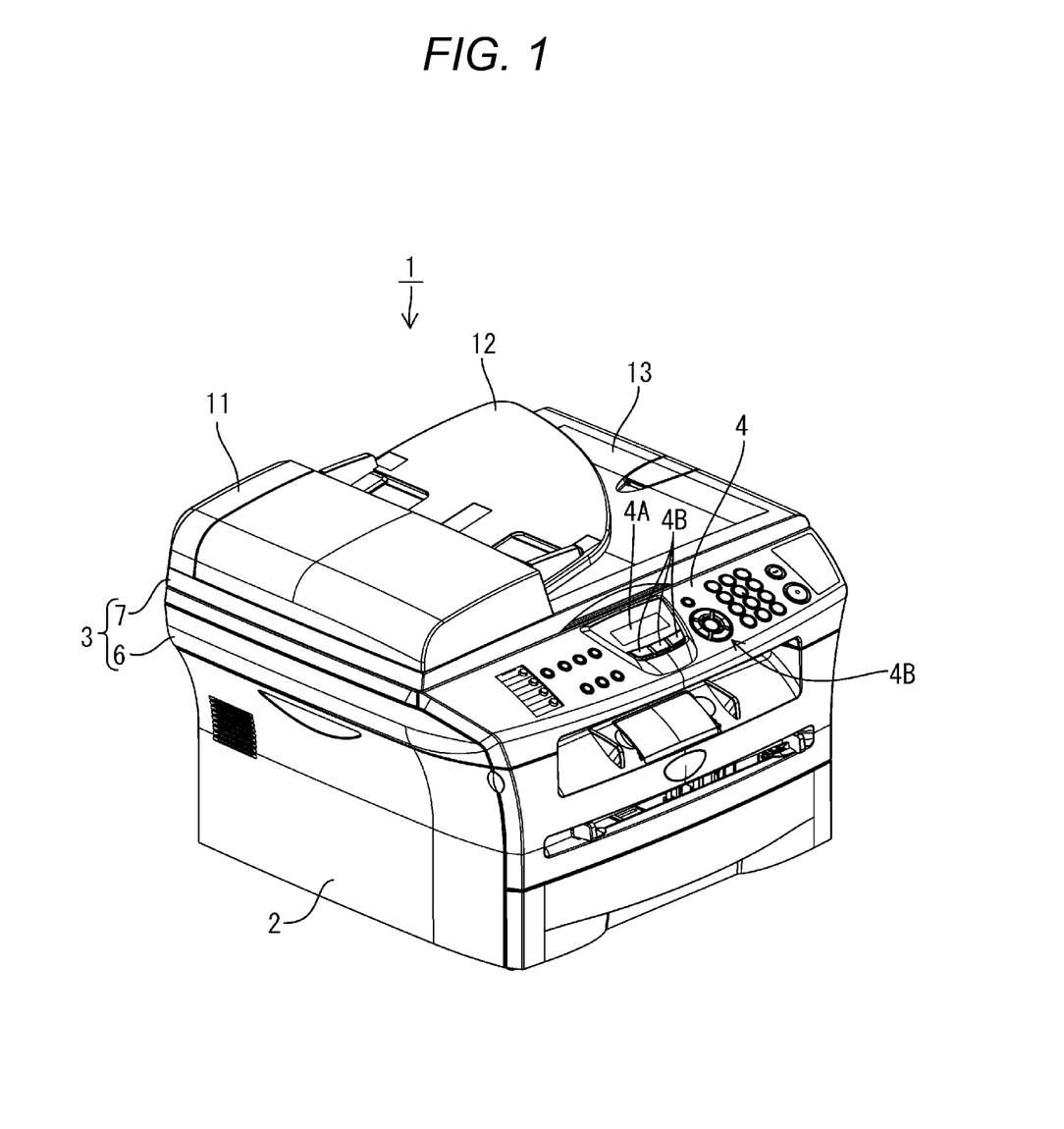
FIG. 1 is a perspective view of an outward appearance of a multi-function device according to an exemplary embodiment of the invention.
Figure 2:
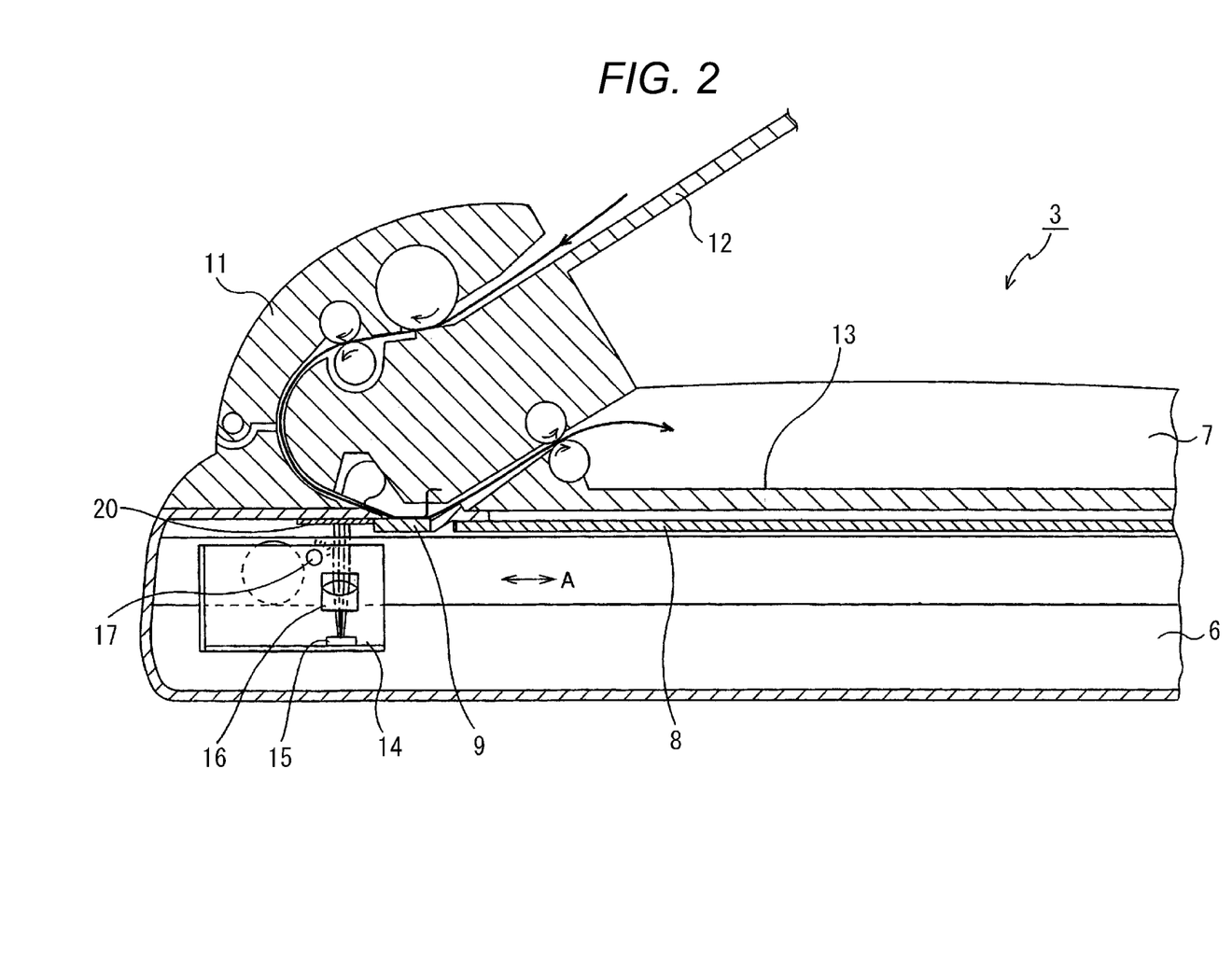
FIG. 2 is an enlarged sectional view of main parts of a document reading unit.

A first exemplary embodiment shows an example in which the image reading apparatus of the invention is applied to a multi-function device 1 having scanner, printer, copier and facsimile functions and the like. FIG. 1 is a perspective view of an outward appearance of the multi-function device 1. FIG. 2 is an enlarged sectional view of main parts of a document reading unit 3.

As shown in FIG. 1, the multi-function device 1 includes a body casing 2 configured to accommodate an image forming unit 38 (refer to FIG. 3) for printing an image on a sheet, and a document reading unit (one example of a reading unit) 3 provided at the upper for reading a document. At the front side of the document reading unit 3, an operation panel 4 (one example of an operation unit) is provided. The operation panel 4 is configured to display an operation state and the like and allows a user to input an operation through the operation panel 4.

As shown in FIG. 2, the document reading unit 3 includes a flat bed part 6 and a document cover part 7, which is openable and closeable with respect to the flat bed part 6 for covering an upper part of the flat bed part 6. At an upper surface of the flat bed part 6, a first platen glass 8 and a second platen glass 9, each of which forms a transparent rectangular shape, are provided in a line. The document cover part 7 includes an ADF (Automatic Document Feeder) 11, a document tray 12 and a discharge tray 13. The ADF 11 is configured to convey documents placed on the document tray 12 one at a time, convey the document to a position facing the second platen glass 9 and then discharge the document onto the discharge tray 13.

A reading head 14 is provided below the first platen glass 8. The reading head 14 includes an image sensor 15 such as CIS (Contact Image Sensor) and CCD, an optical device 16 configured by a lens and the like, and a fluorescent lamp 17 serving as a light source. The image sensor 15 has a plurality of photo diodes, which is arranged in a line in a main scanning direction (direction orthogonal to the sheet). The image sensor 15 is configured to receive light illuminated from the fluorescent lamp 17 to the document and reflected by the document at the respective photo diodes via the optical device 16. Then, the image sensor 15 converts and outputs a light intensity of the reflected light into an electric signal, for each pixel.

The document is read by using the first platen 8 (i.e., placing the document on the first platen 8) or the ADF 11. In the former case, the document is read line-by-line in the main scanning direction (i.e., direction orthogonal to the sheet of FIG. 2) while the reading head 14 is moved in a sub-scanning direction (i.e., arrow A direction in FIG. 2). In the latter case, the document is conveyed to a position facing the second platen glass 9 as the ADF 11 is driven while the reading head 14 is fixed at a position facing the second platen glass 9, so that the document is read line-by-line in the main scanning direction.

2. Electrical Configuration of Multi-function Device

Figure 3:
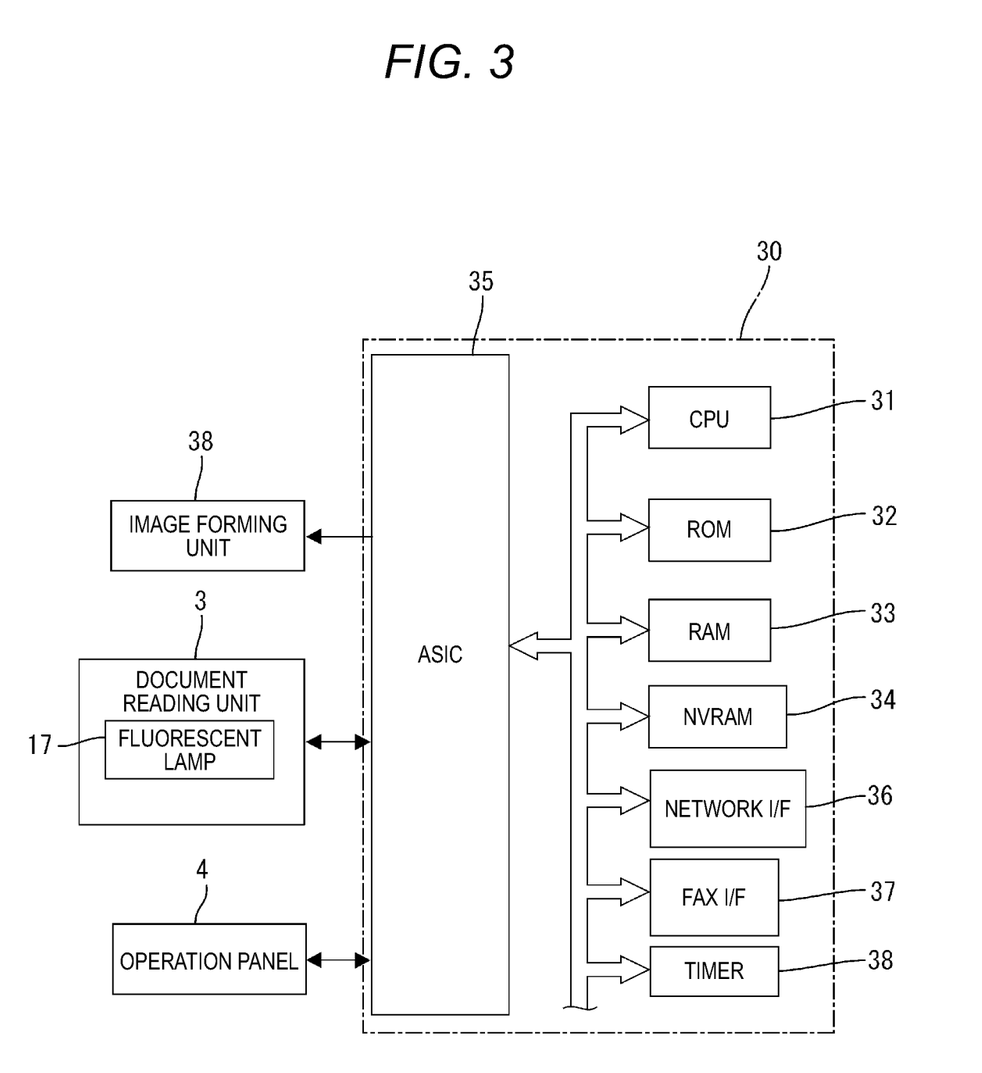
FIG. 3 is a block diagram schematically showing an electrical configuration of the multi-function device.

In the below, an electrical configuration of the multi-function device 1 will be described. FIG. 3 is a block diagram schematically showing an electrical configuration of the multi-function device 1.

The multi-function device 1 includes a control device 39 including a CPU 31, a ROM 32, a RAM 33, an NVRAM (non-volatile memory) 34, an ASIC (Application Specific Integrated Circuit) 35, a network interface 36, a facsimile interface 37, a timer 38 and the like.

The ROM 32 stores a variety control programs for controlling the multi-function device 1, various settings, initial values and the like. The RAM 33 is used as an operation area from which the various control programs are read out or a storage area in which image data is temporarily stored. The ASIC 35 is connected to the image forming unit 38, the document reading unit 3, the operation panel 4 and the like. The CPU 31 (one example of a setting unit and a control unit) controls the respective elements of the multi-function device 1 via the ASIC 35 in accordance with the control program read out from the ROM 32 while storing a processing result in the RAM 33 or NVRAM 34.

The network interface 36 is connected with a computer and the like, and the computer and the multi-function device 1 can perform data communication via the network interface 36. The facsimile interface 37 is connected to a telephone line (not shown), and the multi-function device 1 can perform communication of facsimile data with an external facsimile apparatus and the like via the facsimile interface 37. The timer (one example of a timing unit) 38 performs a variety of time measurements under control of the CPU 31.

3. Document Reading Processing

Figures 4, 4A:
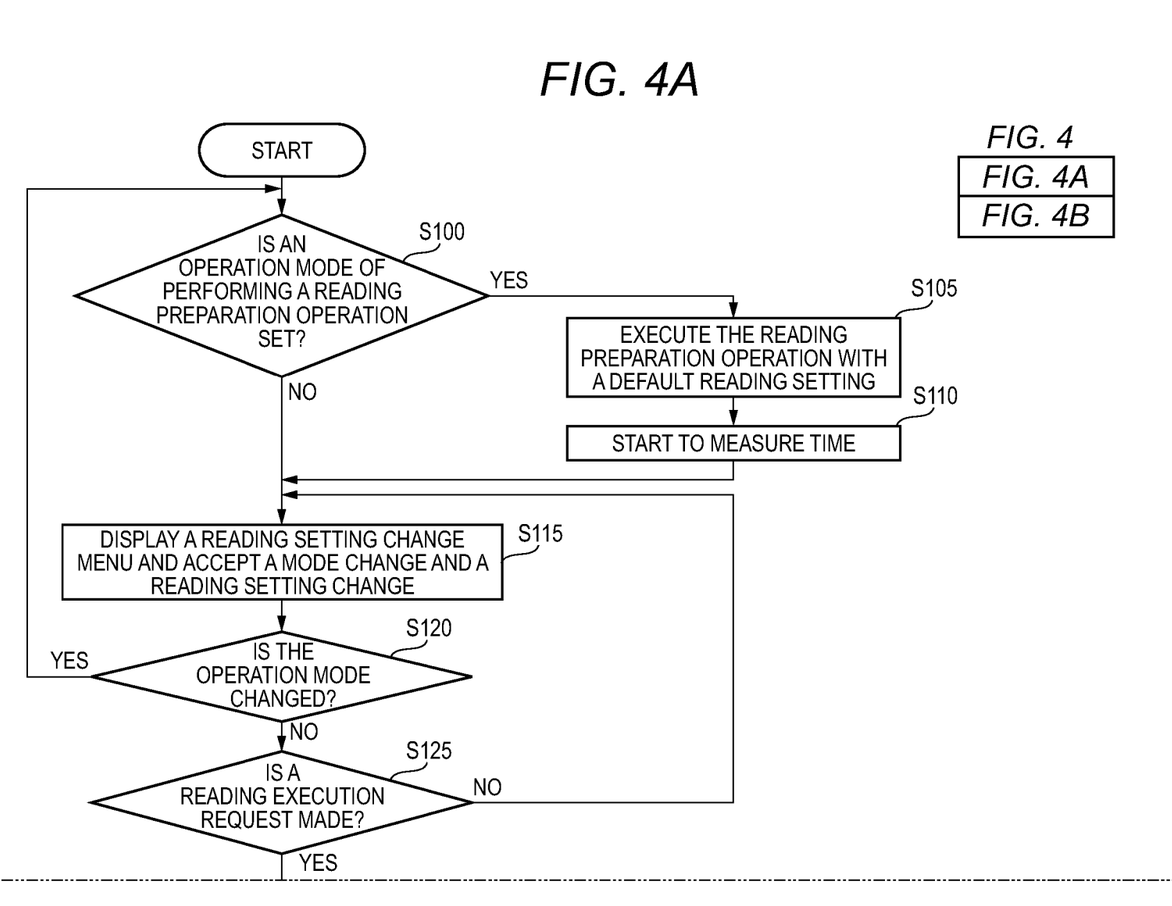
FIGS. 4A and 4B are flowcharts showing document reading processing according to a first exemplary embodiment.
Figure 4B:
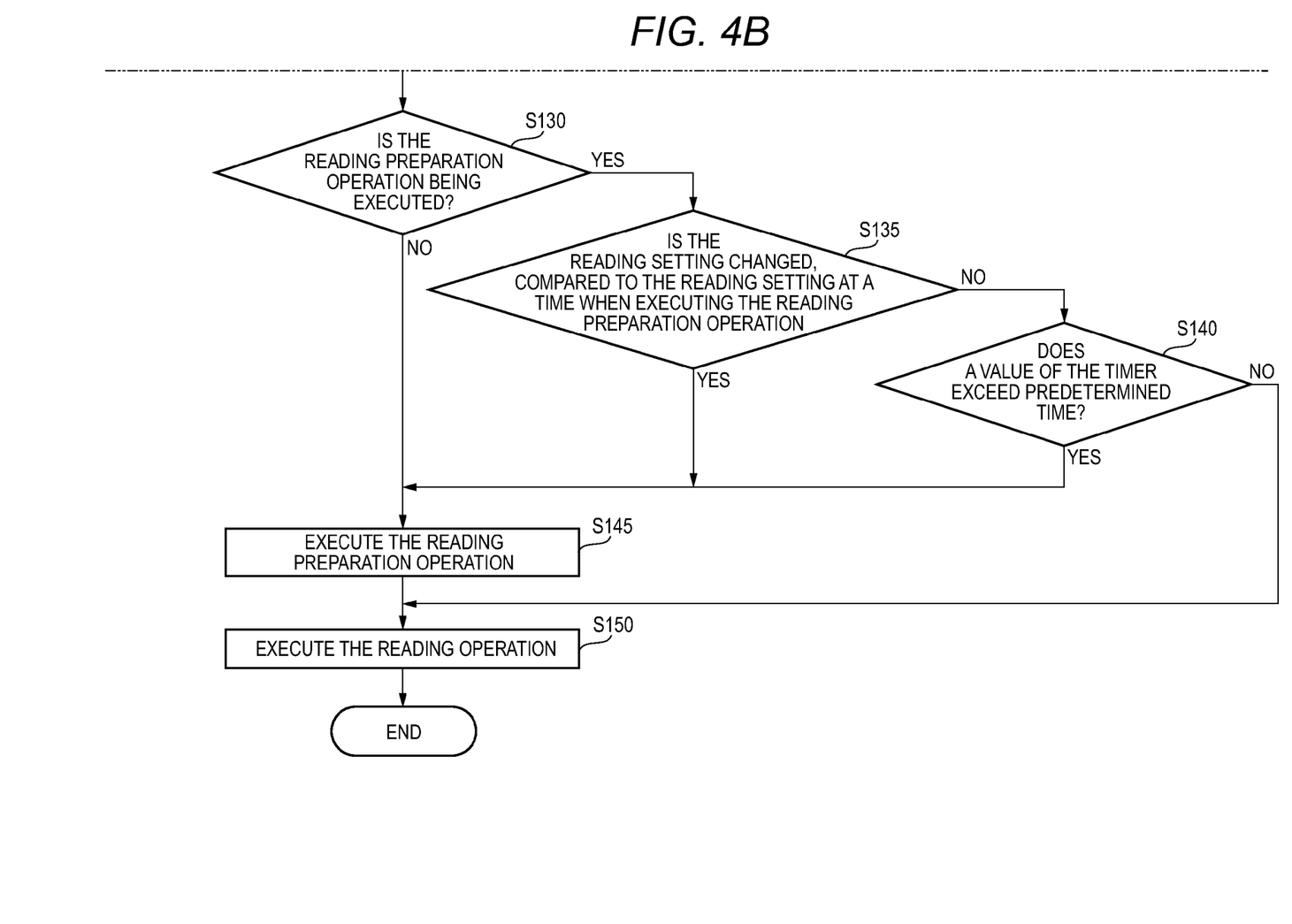

In the below, document reading processing according to the first exemplary embodiment will be described with reference to FIG. 4. FIG. 4 is a flowchart showing document reading processing. The document reading processing is executed under control of the CPU 31 in response to predetermined control program. The document reading processing starts when a user operates an operation button 4B of the operation panel 4 to select one operation mode of a plurality of operation modes in performing the document reading.

In this exemplary embodiment, the plurality of operation modes includes a 'copy mode' of printing and outputting the read data, a 'scan mode' of storing the read data in a memory such as the NVRAM 34, which is an internal memory, and an external memory, and a 'FAX transmission mode' of transmitting and outputting the read data to the outside These operation modes are selectively executed depending on output destinations of the data read by the document reading unit 3. The operation mode is classified into a 'first operation mode,' in which the CPU 31 controls the document reading unit 3 to execute a reading preparation operation before the user makes a reading execution request, and a 'second operation mode,' in which the CPU 31 controls the document reading unit 3 to execute a reading preparation operation after the reading execution request is made. The 'first operation mode' includes the 'FAX transmission mode,' for example. The 'second operation mode' includes the 'copy mode' and the 'scan mode,' for example. The CPU 31 controls the FAX transmission mode as the first operation mode and the copy mode and scan mode as the second operation mode.

As described above, since the timing for performing the reading preparation operation is made to be different depending on the different output destinations of the read data, it is possible to improve the efficiency in reading a document. This is because a frequency that a reading setting (reading condition) is changed is different depending on the different output destinations of the read data. For example, in the 'FAX transmission mode,' the frequency of changing the reading setting is low. Thus, in the 'FAX transmission mode,' even when the reading preparation operation is executed before the reading execution request is made, a probability of re-executing the reading preparation operation in accordance with the changed reading setting is low.

Incidentally, the setting of enabling each operation mode to belong to the 'first operation mode' or 'second operation mode' may be fixedly set at a time when shipping the multi-function device 1. Alternatively, it may be registered by processing of the CPU (one example of a registration unit) 31 in accordance with an operation content of the operation panel 4 by the user. In this case, it is possible to read a document efficiently with reflecting an intention of the user.

The CPU 31 controls the FAX transmission mode as the first operation mode and the copy mode and scan mode as the second operation mode. Under such control state, the CPU 31 may register a predetermined operation mode as an operation mode belonging to one of the first operation mode and the second operation mode in accordance with the operation content of the operation panel 4, and then control the respective modes in accordance with the registration information.

The reading preparation operation includes a black data acquisition operation for correcting the read data, a white data acquisition operation, a dark level acquisition operation for analog front end (AFE) adjustment, a light-amount adjustment operation and the like. Among the operations, the black data acquisition operation and the dark level acquisition operation for AFE adjustment are non-lighting operations in which the fluorescent lamp (light source) 17 of the document reading unit 3 is not turned on.

Here, in the reading preparation operation, the reading head 14 is moved to a position facing a white reference plate 20 (refer to FIG. 2), for example. In the light-amount adjustment operation, the light is illuminated from the fluorescent lamp 17 of the reading head 14 to the white reference plate 20, so as to adjust a bright level. In the dark level acquisition operation for AFE adjustment, a dark level is adjusted, based on a signal received from the image sensor 15, without turning on the fluorescent lamp 17. In the white data acquisition operation, the fluorescent lamp 14 is turned on at a state in which the bright level has been adjusted in the light-amount adjustment operation, so that white data is acquired. On the other hand, in the black data acquisition operation, the black data is acquired without turning on the fluorescent lamp 17 at a state in which the dark level is adjusted in the AFE adjustment. Based on the acquired white data and black data, shading data is prepared, for example.

In the document reading processing, the CPU 31 sets one operation mode of the plurality of operation modes of respectively executing the different processing for a document, in accordance with the operation content of the operation panel 4 by the user, i.e., in accordance with the selection of the operation mode by the user. Then, in the document reading processing of this time, the CPU 31 determines whether the user selects the operation mode of performing the reading preparation operation before making the reading execution request, i.e., whether the operation mode of performing the reading preparation operation is set before the reading execution request is made (step S100). In other words, the CPU 31 determines whether the set operation mode is the 'first operation mode.'

When it is determined that the operation mode of performing the reading preparation operation is set before the reading execution request is made, i.e., when the set operation mode is the 'first operation mode' (step S100: YES), the CPU 31 controls the document reading unit 3 to execute the reading preparation operation with a default reading setting (step S105) and controls the timer (one example of a timing unit) 38 to start measuring time (step S110). Then, the CPU 31 proceeds to a process of step S115. Incidentally, the reading setting corresponds to the 'reading condition.' Also, the default reading setting is such that the setting of color and black/white is black/white and the resolution is 200 dpi, for example.

On the other hand, when it is determined that the operation mode of not performing the reading preparation operation is set before the reading execution request is made, i.e., when the set operation mode is the 'second operation mode' (step S100: NO), the CPU 31 displays a reading setting change menu on a display unit 4A of the operation panel 4 and accepts a change of the operation mode and a change of a reading setting (step S115).

Then, the CPU 31 determines whether the operation mode is changed or not (step S120). When it is determined that the operation mode is changed (step S120: YES), the CPU 31 returns to the process of step S100. At this time, in the step S115, when other mode included in the 'first operation mode' is set (step S100: YES), the CPU 31 controls the document reading unit 3 to re-execute the reading preparation operation (step S105). In this case, even when the operation mode is changed, the reading preparation operation is re-executed before the reading execution request is made only when the changed operation mode is the 'first operation mode.' Therefore, it is possible to improve the efficiency in reading a document.

Incidentally, the invention is not limited to the above. For example, even when the operation mode is changed to the 'second mode,' the reading preparation operation may be re-executed before the reading execution request is made.

Incidentally, in the step S115, when other operation mode included the 'first operation mode' is set and the reading condition (reading setting) is changed, the CPU 31 may control the document reading unit 3 to re-execute the reading preparation operation in the step S105 via the step S100. In this case, when the operation mode is changed but the reading condition is not changed, it is possible to exclude a case where the re-execution of the reading preparation operation is not necessary. That is, since the reading preparation operation is not re-executed when only the operation mode is changed, it is possible to improve the efficiency in reading a document.

On the other hand, when it is not determined that the operation mode is changed (step S120: NO), the CPU 31 determines whether the user makes the reading execution request through the operation panel 4, i.e., whether a reading execution start button is pushed (step S125).

When it is determined that the reading execution request has not been made yet (step S125: NO), the CPU 31 returns to the process of S115. On the other hand, when it is determined that the reading execution request has been made (step S125: YES), the CPU 31 determines whether the reading preparation operation is being already executed, i.e., whether the reading preparation operation is being executed before the reading execution request is made (step S130).

When it is determined that the reading preparation operation is not being executed before the reading execution request is made (step S130: NO), the CPU 31 executes the reading preparation operation. That is, the CPU 31 executes the reading preparation operation after the reading execution request is made (step S145). Then, the CPU 31 controls the document reading unit 3 to perform the reading operation (step S150). On the other hand, when it is determined that the reading preparation operation is being already executed (step S130: YES), the CPU 31 determines whether the reading setting is changed by comparing the same with that at the time when executing the reading preparation operation (step S135). Incidentally, the reading setting is changed as the CPU (one example of a change unit) 31 changes the reading condition of the document reading unit 3 in accordance with the operation content of the user through the operation panel 4 displaying reading setting change menu in the step S115.

When it is determined that the reading setting is changed (step S135: YES), the CPU 31 re-executes the reading preparation operation (step S145). Here, the reason to re-execute the reading preparation operation is as follows. Regarding the reading setting, when the resolution is different, for example, the processing performed in the reading preparation operation is also different. Specifically, when the resolution is 600 dpi, the CPU 31 performs the reading preparation operation of acquiring data of about 5,000 pixels in the main scanning direction when reading the white reference plate; and when the resolution is 300 dpi, the CPU 31 performs the reading preparation operation of acquiring data of about 2,500 pixels in the main scanning direction when reading the white reference plate. Also, when the color reading is set with respect to the reading setting, the CPU 31 performs the reading preparation operation of reading the white reference plate in a color mode so as to acquire data in the color mode; and when the black-and-white reading is set, the CPU 31 performs the reading preparation operation of reading the white reference plate in a black-and-white mode so as to acquire data in the black-and-white mode. According thereto, by performing the different reading preparation operations depending on the reading settings, it is possible to perform the correction of the read data, which is actually generated by reading a document, more appropriately.

On the other hand, when it is not determined that the reading setting is changed (step S135: NO), the CPU 31 determines whether the time measured by the timer 38 exceeds predetermined time, for example one minute (step S140). Incidentally, the predetermined time regarding the measured time may be set depending on the operation modes.

When it is determined that the time measured by the timer 38 exceeds the predetermined time (step S140: YES), the CPU 31 re-executes the reading preparation operation (step S145). On the other hand, when it is not determined that the time measured by the timer 38 exceeds the predetermined time (step S140: NO), the CPU 31 controls the document reading unit 3 to perform the reading operation (step S150). Here, the reason to re-execute the reading preparation operation when the time measured by the timer 38 exceeds the predetermined time is as follows. If the elapsed time after the execution of the reading preparation operation is long, the surrounding temperature of the document reading unit 3 may be changed. In order to cope with such a case, the reading preparation operation is re-executed to reduce an influence due to the change in the surrounding temperature.

Incidentally, the process of step S120 may be omitted. That is, even when the operation mode is changed after the reading preparation operation is executed, the process of determining whether or not to re-execute the reading preparation operation before the reading execution request is made, which is accompanied by the operation mode change, may not be performed.

4. Effects of First Exemplary Embodiment

As described above, in the first exemplary embodiment, the CPU 31 determines whether the set operation mode is the 'first operation mode,' in which the CPU 31 controls the document reading unit 3 to execute the reading preparation operation before the user requests reading execution, or the 'second operation mode,' in which the CPU 31 controls the document reading unit 3 to execute the reading preparation operation after the reading execution request is made. When it is determined that the set operation mode is the 'first operation mode,' the CPU 31 controls the document reading unit 3 to execute the 'reading preparation operation' before the reading execution request is made. Usually, the reading preparation operation is executed before the reading operation is executed, irrespective of the operation modes, so as to secure a predetermined quality of the read data. Therefore, the case where the reading preparation operation is executed before the reading execution request is made and the case where the reading preparation operation is not executed are separated depending on the operation modes. Then, for the operation mode belonging to the 'first operation mode,' the reading preparation operation is executed before the reading execution request is made, and for the operation mode belonging to the 'second operation mode,' the reading preparation operation is executed after the reading execution request is made.

That is, in the first exemplary embodiment, the reading preparation operation is not executed before the reading execution request is made, for all the operation modes. For example, the correction of the black level is executed after the reading execution request is made, for the operation mode belonging to the 'second operation mode.' Accordingly, the number of times of re-corrections of the black level before the execution of the reading operation is reduced. On the other hand, for the operation mode belonging to the 'first operation mode,' the reading preparation operation is executed before the reading execution request is made. Thus, it is possible to start the reading operation immediately after the reading execution request is made, so that it is possible to reduce the reading start time. Accordingly, it is possible to improve the efficiency in reading a document.

<Second Exemplary Embodiment>

Figure 5A:
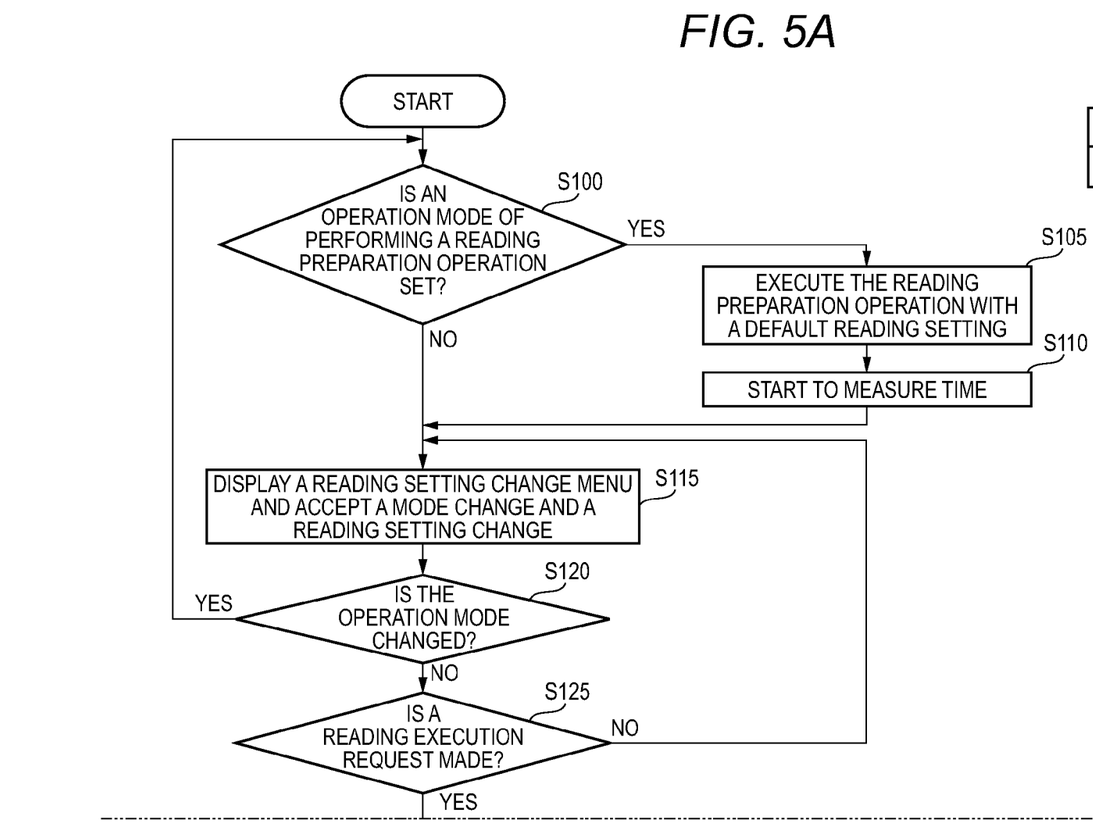
FIGS. 5A and 5B are flowcharts showing document reading processing according to a second exemplary embodiment.
Figure 5B:
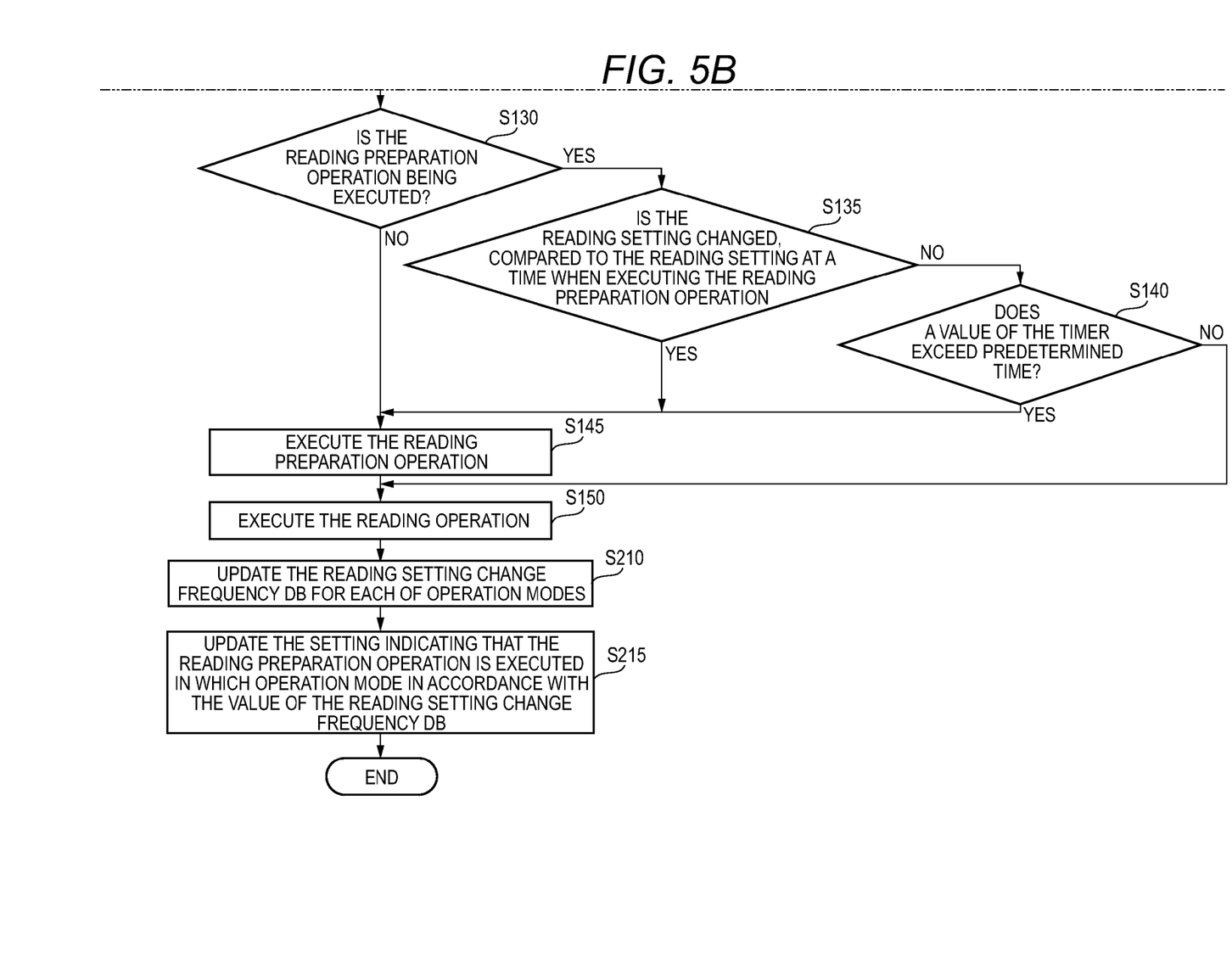

In the below, a second exemplary embodiment will be described with reference to FIG. 5. FIG. 5 is a flowchart showing document reading processing in the second exemplary embodiment. Incidentally, since most of the flowchart is the same as that shown in FIG. 4, the common parts to the flowchart of FIG. 4 are indicated with the same reference numerals and the descriptions thereof are omitted.

In the second exemplary embodiment, the CPU 31 changes a mode attribute of the operation mode, which has been once set as the 'first operation mode,' in which the reading preparation operation is executed before the reading execution request is made, or 'second operation mode,' in which the reading preparation operation is executed after the reading execution request is made, in accordance with the frequency that the reading condition is changed. In other words, the CPU 31 changes the setting indicating that the reading preparation operation is executed in which mode before the reading execution request is made, in accordance with the frequency that the reading condition is changed.

In the second exemplary embodiment, after the reading operation is performed in the step S150 of FIG. 5, the CPU 31 updates a reading setting change frequency DB (database) in each operation mode (step S210). The reading setting change frequency DB is provided in the NVRAM 34, for example. Incidentally, the reading setting change frequency DB is not updated in the operation mode in which the reading setting is not changed in the reading execution of this time.

Then, the CPU 31 may change the setting indicating that the reading preparation operation is executed in which operation mode in accordance with values of the reading setting change frequency DB (step S215). In the second exemplary embodiment, in accordance with values of the reading setting change frequency DB, the CPU 31 changes the operation mode having a low reading setting change frequency, which has been once set as the 'second operation mode,' into the 'first operation mode'; and the operation mode having a high reading setting change frequency, which has been once set as the 'first operation mode,' into the 'second operation mode.' Incidentally, in step S215, the setting is not changed for the operation mode, in which the reading setting change frequency corresponds to the original setting.

Here, the reading setting change frequency is the number of times that the reading setting change is executed in a predetermined time period, for example, the number of times of resolution changes in one day. For example, in a certain period of time, the process of step S210 is executed after executing the process of step S150 in order to collect data of the reading setting change frequency. Then, after the certain period of time, the process of step S215 is executed depending on the reading setting change frequency collected in the process of step S210.

5. Effects of Second Exemplary Embodiment

As described above, in the second exemplary embodiment, the CPU 31 determines whether the operation mode is set as the 'first operation mode' in which the reading preparation operation is executed before the reading execution request is made or the 'second operation mode' in which the reading preparation operation is executed after the reading execution request is made, in accordance with the reading setting change frequency. At that time, the operation mode having a low reading setting change frequency is set as the 'first operation mode,' and the operation mode having a high reading setting change frequency is set as the 'second operation mode. Here, in the operation mode having a high reading setting change frequency, even if the 'reading preparation operation' is executed before the reading execution request is made, a probability that the reading preparation operation will be re-executed after the reading execution request is made is increased. Thus, setting the operation mode having a high reading setting change frequency to be the 'second operation mode,' it is possible to suppress the re-execution of the reading preparation operation. On the other hand, in the operation mode having a low reading setting change frequency, once the reading preparation operation is executed before the reading execution is made, a probability that the reading preparation operation will be executed after the reading execution request is made is low. Thus, by setting the operation mode having a low reading setting change frequency to be the 'first operation mode' so as to execute the reading preparation operation before the reading execution request is made, it is possible to reduce the time from the reading execution request is made to the ending of the reading operation. Hence, it is possible to read a document more efficiently.

Incidentally, regarding the registration setting indicating that the respective operation modes belong to which of the 'first operation mode' and the 'second operation mode,' when the user has not made the registration, a function that changes depending on the reading setting change frequency may be ON; and when the user has made the registration, a function that changes depending on the reading setting change frequency may be OFF. Alternatively, the registration function by the user may be omitted.

<Modifications to Exemplary Embodiments>

The invention is not limited to the above-described exemplary embodiments. For example, following exemplary embodiments may also be included in the technical scope of the invention.

(1) In the above-described exemplary embodiments, the black data acquisition operation, the white data acquisition operation, the dark level acquisition operation for analog front end (AFE) adjustment and the light-amount adjustment operation have been exemplified as the reading preparation operation that is executed before the reading execution request is made. However, the invention is not limited thereto, and other operations may be executed.

Alternatively, only the black data acquisition operation and dark level acquisition operation for analog front end (AFE) adjustment, which are the non-lighting operations of not turning on the fluorescent lamp (light source) 17, may be executed as the reading preparation operation that is executed before the reading execution request is made; the white data acquisition operation and light-amount adjustment operation in which it is necessary to turn on the fluorescent lamp (light source) 17 may be set as the reading preparation operation that is executed after the reading execution request is made. In this case, it is possible to suppress the power for turning on the fluorescent lamp 17 from being used wastefully. The reading execution request is not always made even though the operation mode is selected. For example, in a case in which a preparation operation including turning on the fluorescent lamp 17 is executed upon the operation mode of the 'first operation mode' is selected, if the operation mode is selected but the reading execution request is not made, the power for turning on the fluorescent lamp 17 is spent wastefully.

(2) In the above-described exemplary embodiments, when the set operation mode is the 'first operation mode,' the reading preparation operation is executed before the reading execution request is made. However, the invention is not limited thereto. For example, even when the set operation mode is the 'first operation mode,' the reading preparation operation may not be executed before the reading execution request is made.

(3) In the above-described exemplary embodiments, it has been exemplified that the operation mode, in which the output destinations of the read data are respectively different, is classified into the 'first operation mode' and the 'second operation mode.' However, the invention is not limited thereto. For example, the color reading mode/black-and-white reading mode, the high-definition reading mode/high-productivity reading mode and the like are also included in the operation mode to be classified into the 'first operation mode' and the 'second operation mode.' In this case, for example, the black-and-white reading mode and the high-productivity reading mode are classified into the 'first operation mode,' and the color reading mode and the high-definition reading mode are the 'second operation mode.'

What is claimed is:

1. An image reading apparatus comprising:
   an operation unit;
   a setting unit configured to set one of a plurality of operation modes, in which different processing is executed for a document, in accordance with an operation content of the operation unit;
   a reading unit configured to read the document in response to a reading execution request from the operation unit;
   a change unit configured to change a reading condition by the reading unit in accordance with operation content of the operation unit;
   a storage unit configured to store a frequency that the reading condition is changed after setting the operation mode, for each of the operation modes; and
   a control unit configured to control the reading unit whether or not to execute a reading preparation operation before the reading execution request is made depending on the set operation modes set by the setting unit, wherein, when the set operation mode is a first operation mode, the control unit is configured to control the reading unit to execute the reading preparation operation for the first operation mode before the reading execution request is made and, wherein, when the set operation mode is a second operation mode, the control unit is configured to control the reading unit to execute the reading preparation operation for the second operation mode after the reading execution request is made without executing the reading preparation operation for the second operation mode before the reading execution request is made, wherein the control unit is configured to:
   control an operation mode having a low frequency as the first operation mode; and
   control an operation mode having a high frequency as the second operation mode.

2. The image reading apparatus according to claim 1, wherein the plurality of operation modes comprises operation modes in which output destinations of read data are respectively different.

3. The image reading apparatus according to claim 2, wherein the plurality of operation modes comprises a FAX transmission mode, a copy mode and a scan mode, and wherein the control unit is configured to:
   control the FAX transmission mode as the first operation mode; and
   control the copy mode and the scan mode as the second operation mode.

4. The image reading apparatus according to claim 1, further comprising:
   a registration unit configured to register a predetermined operation mode as an operation mode belonging to one of the first operation mode and the second operation mode in accordance with the operation content of the operation unit.

5. The image reading apparatus according to claim 1, wherein the reading preparation operation comprises a non-lighting operation in which a light source of the reading unit is not turned on.

6. The image reading apparatus according to claim 5, wherein the non-lighting operation comprises a black data acquisition operation for correcting read data and a dark level acquisition operation for analog front end adjustment.

7. The image reading apparatus according to claim 1, wherein the reading preparation operation comprises a white data acquisition operation and a light-amount adjustment operation.

8. The image reading apparatus according to claim 1, further comprising:
   a timing unit configured to measure elapsed time from a time when the reading unit executes the reading preparation operation before the reading execution request is made to a time when the reading execution request is made,
   wherein when the elapsed time is equal to or longer than predetermined time, the control unit controls the reading unit to re-execute the reading preparation operation.

9. The image reading apparatus according to claim 1, further comprising:
   a change unit configured to change a reading condition by the reading unit in accordance with the operation content of the operation unit,
   wherein when the reading condition is changed after the reading unit is controlled to execute the reading preparation operation before the reading execution request is made, the control unit controls the reading unit to re-execute the reading preparation operation.

10. The image reading apparatus according to claim 1, wherein when another operation mode, which is different from the set operation mode, is set after the reading unit is controlled to execute the reading preparation operation before the reading execution request is made in accordance with the set operation mode, the control unit controls the reading unit to re-execute the reading preparation operation.

11. The image reading apparatus according to claim 1, further comprising:
   a change unit configured to change a reading condition by the reading unit in accordance with the operation content of the operation unit,
   wherein when another operation mode, which is different from the set operation mode, is set and the reading condition is changed after the reading unit is controlled to execute the reading preparation operation before the reading execution request is made in accordance with the set operation mode, the control unit controls the reading unit to re-execute the reading preparation operation.

12. A document reading method for an image reading apparatus having a plurality of operation modes in which different processing is executed for a document and comprising a reading unit configured to read the document in accordance with a reading execution request from a user, the document reading method comprising:
setting one of the plurality of operation modes in accordance with selection of the user;
changing a reading condition by the reading unit in accordance with operation content of an operation unit;
counting a frequency that the reading condition is changed after setting the operation mode, for each of the operation modes;
determining whether or not to control the reading unit to execute a reading preparation operation before the reading execution request is made depending on the set operation modes, wherein, when the set operation mode is a first operation mode, the reading preparation operation for the first operation mode is executed before the reading execution request is made and, wherein, when the set operation mode is a second operation mode, the reading preparation operation for the second operation mode is executed after the reading execution request is made without executing the reading preparation operation for the second operation mode before the reading execution request is made;
controlling an operation mode having a low frequency as the first operation mode:
controlling an operation mode having a high frequency as the second operation mode; and
reading the document by the reading unit after the determining.

13. An image reading apparatus having a plurality of operation modes in which different processing is executed for a document, the image reading apparatus comprising:
an operation unit configured to allow a user to input a reading execution request;
a reading unit configured to read the document in response to a reading execution request from the operation unit; and
a controller configured to:
set one of the plurality of operation modes in accordance with an operation content of the operation unit;
change a reading condition by the reading unit in accordance with operation content of the operation unit;
store a frequency that the reading condition is changed after the setting of the one of the plurality of operation modes, for each of the operation modes, in a storage unit; and
control the reading unit whether or not to execute a reading preparation operation before the reading execution request is made depending on the set operation modes set by the setting unit, wherein, when the set operation mode is a first operation mode, the controller controls the reading unit to execute the reading preparation operation for the first operation mode before the reading execution request is made and, wherein, when the set operation mode is a second operation mode, the controller controls the reading unit to execute the reading preparation operation for the second operation mode after the reading execution request is made without executing the reading preparation operation for the second operation mode before the reading execution request is made, wherein the controller is configured to:
control an operation mode having a low frequency as the first operation mode; and
control an operation mode having a high frequency as the second operation mode.

* * * * *